United States Patent [19]

Donovan et al.

[11] Patent Number: 5,712,338
[45] Date of Patent: Jan. 27, 1998

[54] INK JET INKS CONTAINING POLYACRYLAMIDES

[75] Inventors: David Herbert Donovan, Barcelona, Spain; Gregg Allen Lane, San Diego, Calif.; Chaucer C. Tang, Kennett Square, Pa.

[73] Assignee: E. I. Du Pont de Nemours and Company, Wilmington, Del.

[21] Appl. No.: 774,994

[22] Filed: Dec. 27, 1996

[51] Int. Cl.$^6$ .................... C08L 53/00; C08L 51/00; C08L 33/26
[52] U.S. Cl. .................... 524/505; 524/504; 524/521
[58] Field of Search .................... 523/160, 161; 524/505, 521, 504; 106/31.27, 31.28, 31.6, 31.9

[56] References Cited

U.S. PATENT DOCUMENTS

| | | | |
|---|---|---|---|
| 4,157,995 | 6/1979 | Schenck et al. | 524/521 |
| 4,163,738 | 8/1979 | Corwin | 524/376 |
| 4,425,469 | 1/1984 | Emmons et al. | 524/750 |
| 5,085,698 | 2/1992 | Ma et al. | 106/20 D |
| 5,181,045 | 1/1993 | Shields et al. | 106/31.27 |
| 5,428,383 | 6/1995 | Shields et al. | 106/31.27 |

FOREIGN PATENT DOCUMENTS

| | | | |
|---|---|---|---|
| 0 068 903 B1 | 5/1985 | European Pat. Off. | C09D 11/10 |
| 62-124167 | 6/1987 | Japan | C09D 11/00 |
| 3-240557 | 10/1990 | Japan | B41J 2/21 |
| 5-230410 | 9/1993 | Japan | C09D 11/00 |
| 02 152 514 A | 8/1985 | United Kingdom | C08L 33/00 |

*Primary Examiner*—Peter A. Szekely

[57] ABSTRACT

Ink jet ink compositions containing an aqueous carrier medium, an aqueous carrier medium insoluble colorant, a structured polymeric dispersant and a film-forming polyacrylamide polymer having a weight average molecular weight of 500–100,000 exhibit reduced film cracking, rapid drying, excellent image definition, are storage stable and have excellent decap properties and, when used in combination with a differently colored ink, result in reduced bleed in multi-colored printed elements.

10 Claims, No Drawings

INK JET INKS CONTAINING POLYACRYLAMIDES

BACKGROUND OF THE INVENTION

This invention relates to aqueous inks for ink jet primers and, more particularly, to aqueous ink jet inks containing a low molecular weight polyacrylamide additive to reduce film cracking. When an ink having said additive is printed in contact, i.e. adjacent to or in overlay relationship, with another differently colored ink, bleed between the two inks is reduced.

Ink jet printing is a non-impact and non-contact printing process in which an electronic signal produces droplets of ink that are deposited on a wide variety of substrates such as paper, transparent film, plastics, metals and fabrics. It is extremely versatile in substrate variety, in print quality and in speed of operation. It is digitally controllable. For these reasons, ink jet is widely used industrially for marking and labeling. In the office, it has been broadly utilized as output for personal computers. This is especially true for thermal or bubble jet drop-on-demand printers with disposable ink cartridges. These printers have been widely received due to their high print quality, low cost, relatively quiet operation and graphics capability.

One problem encountered in aqueous ink jet printing on transparencies and other non-permeable substrate media is known as film cracking. As ink dries over an impermeable substrate, shrinkage occurs, due to molecular associations of components of the ink, and due to the loss of water molecules which hydrate the non-volatile components of the ink. This shrinkage produces strain, as the ink film attempts to retract from its full area. If the strain produced by this shrinkage exceeds the cohesive strength of the film being formed by the drying ink, tears in the film occur to relieve this stress, producing an appearance similar to cracks in dried mud. These tears or cracks in the ink produce an image with very poor optical density and, if large enough to be visible, result in an unacceptable image.

A problem can also exist when a multi-colored element is desired in which an ink of one color is placed in contact with an ink of another color. This problem is manifested in a mixing or "bleeding" of the two inks at their interface, whereby the line of demarcation between the two printing liquids is obscured. Bleeding may cause undesired color formation at the interface and a concurrent loss of resolution, color separation, edge acuity and color purity in the image. The more contrasting the two adjacent liquids are in color (such as black and yellow), the more visual the bleed. Bleed is also particularly noticeable when the mixing of two inks produces a secondary color, such as when blue and yellow mix to produce green. Bleed is a particular problem in ink jet printing because the relatively low viscosity inks used therein tend to spread and because ink jet printers have the capability of printing three or four primary colors in simultaneous (or near simultaneous) fashion.

Several methods have been proposed to prevent bleed of adjacent inks. The most obvious method is to apply the two inks at a distance from one another such that no intermingling or mixing of the inks can occur. This method is not a solution to the problem, however, and produces images having poor resolution.

Another method, and the one most commonly used, involves delay in applying the second ink until the first ink is completely dry. This method is also disadvantageous, not only because of its inefficiencies, but also because it is not particularly effective. For example, it has been observed that bleed may occur even if the first ink is dry, which is believed to be caused by the colorants of the first ink becoming "redissolved" in the liquid medium of the second ink. Thus, the more soluble the components of the first ink in the liquid medium, the more likely bleed will occur even if the first ink is dry. This method is particularly disadvantageous in ink jet printing applications because it places an arbitrary limitation on the efficiency of generating multi-colored prints.

U.S. Pat. No. 5,091,005 teaches that the addition of formamide to the inks will reduce the occurrence of bleed in some circumstances. Yet another approach to control bleed is to increase the rate of penetration of the ink into the substrate, which has its own shortcomings. First, it is inherently limited to those printing applications using particular ink/substrate combinations. For example, highly absorbent substrates may be required to control bleed. Second, bleed will still be apparent unless the first ink becomes bound to the substrate such that it will not be dissolved by the liquid medium of the second ink. Third, known ways of increasing penetration have disadvantages in that they have a tendency to degrade text quality.

Accordingly, a need exists for additives that will reduce film cracking and bleed in inks containing them when printed in contact with a differently colored ink, without degrading print quality. Applicant has found that the incorporation of low molecular weight polyacrylamide additives into an ink jet ink composition reduce film cracking, and when an ink having said additive is printed in contact, i.e. adjacent to or in overlay relationship, with another differently colored ink, bleed between the two inks is reduced.

SUMMARY OF THE INVENTION

The present invention provides an ink jet ink comprising:
(a) an aqueous carrier medium;
(b) an aqueous carrier medium insoluble colorant;
(c) a structured polymer dispersant; and
(d) a film-forming polyacrylamide polymer having a weight average molecular weight of 500–100,000. Preferably the polyacrylamide polymer has a weight average molecular weight of 1000–50,000, and more preferably 2000 to 20,000. In addition, the polyacrylamide polymer is preferably non-ionic.

In another embodiment, the invention provides a process for creating a multicolor printed element having reduced color bleed, the process comprising:
(a) printing a first ink onto a substrate;
(b) printing a second ink onto a substrate and in contact with said first ink;
(c) wherein at least one of said first and second inks comprises an aqueous carrier medium, an aqueous carrier medium insoluble colorant, a structure polymeric dispersant and a film-forming polyacrylamide polymer having a weight average molecular weight of 500–100,000.

The inks of the invention are stable, have low viscosity, exhibit excellent print quality, provide excellent smear resistance after drying and good decap or crusting time. They may be used with a variety of ink jet printers such as continuous, piezoelectric, drop-on-demand and thermal or bubble jet drop-on-demand, and are particularly adapted for use in thermal ink jet printers. These inks may also be useful in air brush printing devices. While the inks typically will be applied in abutting relationship on a medium when making multicolor elements, the inks also may be applied in an overlay relationship.

DETAILED DESCRIPTION OF THE EMBODIMENTS

The ink jet ink composition of this invention essentially comprise an aqueous carrier medium, a colorant, a structured polymeric dispersant and a film-forming polyacrylamide polymer. The inks may also contain other components or additives known in the art.

Aqueous Carrier Medium

The aqueous carrier medium is water or a mixture of water and at least one water soluble organic solvent. Selection of a suitable mixture depends on requirements of the specific application, such as desired surface tension and viscosity, the selected colorant, drying time of the ink, and the type of substrate onto which the ink will be printed. Representative water-soluble organic solvents that may be selected are disclosed in U.S. Pat. No. 5,085,698. A mixture of water and a polyhydric alcohol, such as diethylene glycol, is preferred as the aqueous carrier medium.

If a mixture of water and a water-soluble solvent is used, the aqueous carrier medium usually contains from about 30% to about 95% water with the balance (i.e., 70 to 5%) being the water-soluble solvent. Preferably, the aqueous carrier medium is 60–95%, by weight, water. The aqueous carrier medium comprises 70 to 99.8%, by weight of the total ink composition, depending on the type of colorant selected. Preferably, the aqueous carrier medium comprises 94–99.8% when an organic pigment is selected; 70 to 99.8% when an inorganic pigment is selected; and 80 to 99.8% when a dye is selected.

Colorants

The colorant is either a dye or a pigment that is insoluble in the aqueous carrier medium. By the term "dye" we mean a colorant that becomes soluble at some point during the printing process. By "pigment" we mean a colorant that is insoluble (i.e., in particulate or crystalline form) throughout the printing process. Pigments are the preferred colorants for use in the compositions of this invention.

Pigments

Useful pigments comprise a wide variety of organic and inorganic pigments, alone or in combination. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from settling. It is also desirable to use small particles for maximum color strength. The range of useful particle size is approximately 0.005 micron to 15 microns, preferably 0.005 to 5 microns, and most preferably from 0.01 to 0.3 micron.

The selected pigment may be used in dry or wet (i.e., presscake) form. In presscake form, the pigment is not aggregated to the extent that it is in dry form and therefore do not require as much deaggregation in the process of preparing the inks. Representative commercial dry and presscake pigments that may be used in practicing the invention are disclosed in U.S. Pat. No. 5,085,698 issued Feb. 4, 1992.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

In the case of organic pigments, the ink may contain up to approximately 30% pigment by weight, but typically will be in the range of approximately 1 to 15% (preferably 1 to 8%) by weight of the total ink composition for most thermal ink jet printing applications. If an inorganic pigment is selected, the ink will tend to contain higher weight percentages of the pigment than with comparable inks employing organic pigment, and may be as high as 50% because inorganic pigments generally have higher specific gravities than organic pigments.

Dyes

The color and amount of dye present in the ink composition is largely a function of choice, being primarily dependent upon the desired color of the print achieved with the ink, the purity of the dye and its strength. Low concentrations of dye may not give adequate color vividness whereas high concentrations may result in poor printhead performance or unacceptably dark colors. Generally, the dye will be present in the amount of 0.01 to 20%, preferably 0.05 to 8%, and most preferably 1 to 5%, by weight, based on the total weight of the ink composition.

Structured Polymeric Dispersant

The function of the structured polymeric dispersant in the present ink compositions is to disperse the insoluble colorant in the aqueous carrier. By "structured polymer" we mean any polymer that does not have a random structure. Stated differently, the term "structured polymer" means that the polymer has identifiable and defined segments or areas based on functionality of the monomers contained within the segment or area. Examples of structured polymers include block polymers, graft polymers, tapered polymers and branch polymers. Particularly preferred structured polymeric dispersants for use in the present invention include AB, BAB and ABC block copolymers. In AB or BAB block copolymers the A segment is a hydrophobic (i.e., water insoluble) homopolymer or copolymer which serves to link with the colorant and the B block is a hydrophilic (i.e., water soluble) homopolymer or copolymer, or salts thereof, and serves to disperse the colorant in the aqueous medium. Such polymeric dispersants and the synthesis thereof are disclosed in Ma et al., U.S. Pat. No. 5,085,698 issued Feb. 4, 1992.

Preferred AB block polymers are: methyl methacrylate// methyl methacrylate/ methacrylic acid(10//5/7.5), 2-ethylhexyl methacrylate//2-ethylhexyl methacrylate/ methacrylic acid(5//5/10), n-butyl methacrylate//n-butyl methacrylate/methacrylic acid (10//5/10), n-butyl methacrylate//methacrylic acid(10//10), ethylhexyl methacrylate//methyl methacrylate/methacrylic acid (5//10/10), n-butyl methacrylate//2-hydroxyethyl methacrylate/ methacrylic acid(5//10/10), n-butyl methacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/ dimethylaminoethyl methacrylate(5//5/10). Preferred BAB block polymers are: n-butyl methacrylate/methacrylic acid/ /n-butyl methacrylate//n-butyl methacrylate/methacrylic acid (5/10//10//5/10), methyl methacrylate/methacrylic acid/ /methyl methacrylate//methyl methacrylate/methacrylic acid (5/7.5//10//5/7.5). The double slash indicates a separation between blocks and a single slash indicates a random copolymer. The values in parenthesis represent the degree of polymerization of each monomer.

To solubilize the B block into the aqueous medium, it may be necessary to make salts of either the acid or amino groups contained in the B block. Salts of the acid monomers can be made with the counter component being selected from organic bases such as mono-, di-, tri-methylamine, morpholine, n-methyl morpholine; alcohol amines such as dimethylethanolamine (DMEA), methyldiethanolamine, mono-, di-, and tri-ethanolamine; pyridine; ammonium hydroxide; tetra-alkylammonium salts such as tetramethylammonium hydroxide, tetraethylammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers.

Salts of the amino monomers can be made with the counter component being selected from organic acids such as acetic acid, formic acid, oxalic acid, dimethylol propionic acid, halogens such as chloride, fluoride, and bromide, and other inorganic acids, such as sulfuric acid, nitric acid, phosphoric acid and the like. It is also possible to convert the amino group into a tetra-alkyl ammonium salt. Amphoteric polymers, that is polymers that are capable of ionizing into either anions or cations, may be used as is or can be neutralized with either addition of acid or base.

ABC triblock polymers useful in preparing colorant dispersions are disclosed in European Patent Application 0 556 649 A1 published on Aug. 28, 1993. Other structured polymer dispersants known to one skilled in the art are also considered useful.

Polyacrylamide

Polyacrylamides useful in this invention are carbon chain based polymers which are derived from an acrylamide monomer having the structure $CH_2=CH_2—CONH_2$. They have the following general structure:

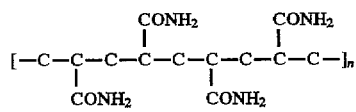

The polyacrylamides useful in this invention may have a weight average molecular weight of 500–100,000, preferably 1000–50,000, and more preferably 2000 to 20,000. High molecular weight polyacrylamides, such as those with a weight average molecular weight of about 1 million are not useful because they cause a degradation in pen performance at levels of the polymer that are needed for an improvement in bleed. Non-ionic polyacrylamides are preferred. Some commercially available polyacrylamides include Cyanamer® N-100, Cyanamer® N-10 and Cyanamer® A15-L, manufactured by American Cyanamide.

The polyacrylamide polymer is present in the mount of 0.1 to 10%, preferably 0.5 to 4% by weight, based on the total weight of the ink composition.

Other Ingredients

The ink may contain other ingredients. For example, surfactants may be used to alter surface tension as well as maximize penetration. Care must be taken in selecting the surfactant, however, because the surfactant may also destabilize the colorant dispersion. The choice of a specific surfactant is also highly dependent on the type of media substrate to be printed. Appropriate surfactants are readily selected for the specific substrate to be used in printing. In aqueous inks, the surfactants may be present in the amount of 0.01 to 5% and preferably 0.2 to 2%, based on the total weight of the ink.

Biocides may be used in the ink compositions to inhibit growth of microorganisms. Dowicides® (Dow Chemical, Midland, Mich.), Nuosept® (Huls America, Inc., Piscataway, N.J.), Omidines® (Olin Corp., Cheshire, Conn.), Nopcocides® (Henkel Corp., Ambler, Penn.), Troysans® (Troy Chemical Corp., Newark, N.J.) and sodium benzoate are examples of such biocides. In addition, sequestering agents such as EDTA may also be included to eliminate deleterious effects of heavy metal impurities. Other known additives, such as humectants, viscosity modifiers and other acrylic or non-acrylic polymers made also be added to improve various properties of the ink compositions. Furthermore, to improve chroma and hue, dyes commonly used in aqueous inks which include, for example, Acid, Direct, Food and Reactive dyes, may be used in combination with the selected insoluble colorant.

Ink Preparation

The inks are prepared by premixing the selected colorants and dispersant in the aqueous carrier medium and then dispersing or deflocculating the colorant. This step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the colorant in the aqueous carrier medium.

It is generally desirable to make ink jet inks in concentrated form to maximize the efficiency of the manufacturing process and equipment. The concentrated ink jet inks are subsequently diluted to the appropriate concentration for use in the ink jet printing system by adding water and/or appropriate solvents. By dilution, the ink is adjusted to the desired viscosity, color, hue, saturation density, and print area coverage for the particular application.

Jet velocity, separation length of the droplets, drop size, and stream stability are greatly affected by the surface tension and the viscosity of the ink. Pigmented ink jet inks suitable for use with ink jet printing systems should have a surface tension in the range of about 20 dyne/era to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. They may be used with a variety of ink jet printers such as continuous, piezoelectric drop-on-demand and thermal or bubble jet drop-on-demand, and are particularly adapted for use in thermal ink jet printers. The inks have excellent storage stability for a long period and do not clog in an ink jet apparatus. Fixing the ink on the image recording material, such as, paper, fabric, film, etc., can be carried out rapidly and accurately.

The printed ink images have clear color tones, high density, excellent water resistance and lightfastness, particularly when a pigment is used as the colorant. Furthermore, the ink does not corrode parts of the ink jet printing device.

Process of Use

These ink jet inks are useful in printing single and multicolor images. The invention provides a process for creating a multicolor printed element having reduced color bleed. According to the inventive process, an ink as described above is printed on a substrate in contact with a second ink. The second ink may be one of this invention or it may be a conventional ink jet ink. The first and second inks may be in an abutting or overlay relationship to each other.

EXAMPLES

The invention will now be further illustrated by, but not limited to, the following examples, in which parts and percentages are by weight unless otherwise noted.

Polymer preparation 1:

This shows the preparation of a cationic polymer used to disperse pigment. It is a BZMA//DMAEMA 10//20 diblock polymer.

A 12-liter flask was equipped with a mechanical stirrer, thermometer, $N_2$ inlet, drying tube outlet, and addition funnels. Tetrahydrofuran THF, 4002 gm, and p-xylene, 7.7 gm, were charged to the flask. The catalyst tetrabutyl ammonium m-chlorobenzoate, 2.0 ml of a 1.0M solution in acetonitrile, was then added. Initiator, 1-methoxy-1-trimethylsiloxy-2-methyl propene, 155.1 gm (0.891M) was injected. Feed I [2-dimethylaminoethyl methacrylate DMAEMA, 2801 gm (17.8M)] was started at 0.0 minutes and added over 45 minutes. One hundred minutes after Feed I was completed (over 99 % of the monomers had reacted) Feed II [benzyl methacrylate, 1568 gm (8.91M)] was started and added over 30 minutes.

At 400 minutes, 310 gm of dry methanol were added to the above solution and distillation begun. A total of 1725 gm of solvent was removed. I-propanol, 1783 gm, was added after completion of the distillation. This made a BZMA//DMAEMA 10//20 diblock polymer at 49.6 % solids and a Mn=5000.

Polymer Preparation 2:

This shows the preparation of BMA/MMA//MAA (10/5//10) AB Block Copolymer

A 12-liter flask was equipped with a mechanical stirrer, thermometer, $N_2$ inlet, drying tube outlet, and addition funnels. THF, 3027 gm, and p-xylene, 6.2 gm, were charged to the flask. The catalyst (tetrabutyl ammonium m-chlorobenzoate, 2.5 ml of a 1.0M solution in acetonitrile) was then added. Initiator, 1,1-bis(trimethylsiloxy)-2-methyl propane, 234.4 gm (1.01M) was injected. Feed I [tetrabutyl ammonium m-chlorobenzoate (2.5 ml of a 1.0M solution in acetonitrile)] was started and added over 150 minutes. Feed II [trimethylsilylmethacrylate, 1580 gm (10.0M)] was started at 0.0 minutes and added over 30 minutes. One hundred and twenty minutes after Feed II was completed (over 99% of the monomers had reacted). Feed III (butyl methacrylate, 1425 gm (10.0M), and methyl methacrylate, 503 gm (5.0M) was started and added over 30 minutes.

At 320 minutes, 650 gm of dry methanol were added to the above solution and distillation was begun. During the first stage of distillation, 1250.0 gm of material with a boiling point of below 55° C., were removed from the flask. The theoretical amount of methoxytrimethylsilane (BP=54° C.,) to be removed was 1144.0 gm. Distillation continued during the second stage while the boiling point increased to 76° C. During the second stage of distillation. 1182 gms of i-propanol were added. A total of 2792 gms of solvent were removed. This made a butyl methacrylate/methyl methacrylate//methacrylic acid (BMA/MMA//MAA, 10/5//10) AB block polymer of 2900 MW and 50.5% solids.

Dispersion Preparation 1:

This shows the preparation of a cationic yellow pigment dispersion using a BZMA//DMAEMA 10//20 diblock polymer and a two-roll mill.

A yellow pigment dispersion was prepared by thoroughly mixing the following ingredients:

| Ingredient | Amount (grams) |
| --- | --- |
| Polymer from Preparation 1 (55.91% solids) | 214.6 |
| Pigment Yellow 14, Spectra PAC ®, Sun Chemical Co., Cincinnati, OH. | 239.9 |

This mixture was then charged to a two-roll mill and processed for 30 minutes. This made a pigment dispersion that contained 66.6 % pigment and 33.3 % polymer (pigment/dispersant ratio ("P/D")=2/1).

An aqueous pigment dispersion concentrate was prepared by mixing the two-roll mill chip and dissolving it, with adequate stirring, using phosphoric acid as the neutralizing agent:

| Ingredient | Amount (grams) |
| --- | --- |
| Pigment Dispersion 1 | 80.00 |
| Phosphoric acid (86.0%) | 13.14 |
| Deionized water | 307.00 |

Additional water was added to give an aqueous pigment concentrate that contained 11.01% pigment and had 90 mole % of the amine groups from the polymer neutralized with phosphoric acid.

Dispersion Preparation 2:

This shows the preparation of a cationic cyan pigment dispersion using a BZMA//DMAEMA 10//20 diblock polymer and a two-roll mill.

A cyan pigment dispersion was prepared by thoroughly mixing the following ingredients:

| Ingredient | Amount (grams) |
| --- | --- |
| Polymer from Preparation 1 (55.91% solids) | 214.6 |
| Pigment Blue 15:3, Heliogen ® 7072D, Hoechst Inc. | 180.0 |

This mixture was then charged to a two-roll mill and processed for 30 minutes. This made a pigment dispersion that contained 60 % pigment and 60 % polymer (P/D=1.5/1).

An aqueous pigment dispersion concentrate was prepared by mixing the two-roll mill chip and dissolving it, with adequate stirring, using phosphoric acid as the neutralizing agent:

| Ingredient | Amount (grams) |
| --- | --- |
| Pigment Dispersion 2 | 80.00 |
| Phosphoric acid (86.0%) | 13.14 |
| Deionized water | 307.00 |

Additional water was added to give an aqueous pigment concentrate that contained 11.01% pigment and had 90 mole % of the amine groups from the polymer neutralized with phosphoric acid.

Dispersion Preparation 3:

A black pigment dispersion was prepared by premixing 191.9 gms of Polymer 2; 200.0 gms of FW-18 black pigment (Degussa Corp., Allendale, N.J.); 135.0 gms of diethylene glycol and 450.0 gms of i-propanol. The premixture was then charged to a two-roll mill (Model XJF-S2637; Adalet Manufacturing Co., Cleveland, Ohio) and processed for 45 minutes. The temperature of one roll was held at 150° C. and the other roll was approximately 10° C. cooler. This made a pigment dispersion that contained 53.1% pigment, 26.5% polymer (P/B=2/1) and 20.4% diethylene glycol.

An aqueous pigment concentrate using potassium hydroxide as the neutralizing agent was then prepared by mixing 37.66 gms of pigment dispersion prepared above with 4.62 gm of 45% KOH and 160.1 gms of deinoized water with stirring. The resulting pigment concentrate contained 10% pigment and had 80 mole % of the acid groups from the polymer neutralized with potassium hydroxide.

Control 1:

0.9 grams of diethylene glycol, 1.5 grams of Liponics® EG-1, and 3.5 grams of 2-pyrrolidinone were measured out in a beaker. 29.1 grams of water were added, and the solution stirred. This mixture was slowly poured into another beaker containing 15 grams of concentrate from Dispersion Preparation 3 with stirring. This procedure resulted in 50 grams ink.

40 grams of this ink were filled into empty thermal ink jet print cartridges, Hewlett-Packard P/N 51640A, Hewlett-Packard Co., Palo Alto, Calif. The cartridges were loaded into a Hewlett-Packard Deskjet 1200C printer. Xerox 3R3351 transparency film, Xerox Corp., Rochester, N.Y., was loaded into the printer's paper tray. A test plot consisting of a black rectangle was created with the Microsoft Word 2.0 drawing tool, Microsoft Corp., Redmond, Wash. The plot was sent to the printer using the Windows Deskjet 1200C version 3.40 printer driver.

The imaged area of the transparency film sample showed numerous small gaps in the black square, where ink did not properly cover the film. When observed using an overhead projector, the samples were of poor quality, faded out and were uneven in opacity. Results are shown in Table 1 below.

Example 1

0.9 grams of diethylene glycol, 1.5 grams of Liponics® EG-1, 3.5 grams of 2-pyrrolidinone, and 1.5 gram of Cyanamer® A15-L anionic polyacrylamide were measured out in a beaker. 27.6 grams of water were added, and the solution stirred. This mixture was slowly poured into another beaker containing 15 grams of concentrate from Dispersion Preparation 3, with stirring. This procedure resulted in 50 grams of ink which were tested as described in Control 1. There were no gaps in the black square, and the image appeared uniform and opaque when observed using an overhead projector. The results are shown in Table 1 below.

TABLE 1

| Ink Sample | Uniformity | Opacity |
|---|---|---|
| Control 1 | poor | poor |
| Example 1 | good | good |

Control 2

A yellow ink was prepared containing 3% pigment using Pigment Dispersion 1. The ink had the following composition:

| Ingredient | Amount (grams) |
|---|---|
| Pigment Dispersion 1 | 27.3 |
| 2-ethyl-2(hydroxymethyl)-1,3-propanediol (50% solution in deionized water)* | 18.0 |
| Deionized water | 54.7 |

*In the amount used, this component functions as a humectant

A cyan ink were prepared containing 3% pigment using the Pigment dispersion 2. The ink had the following composition:

| Ingredient | Amount (g) |
|---|---|
| Pigment Dispersion 2 | 27.3 |
| 2-ethyl-2(hydroxymethyl)-1,3-propanediol (50% solution in deionized water)* | 18.0 |
| Deionized water | 54.7 |

*In the amount used, this component functions as a humectant

These inks were printed on an HP Deskjet printer, Hewlett Packard Co., Palo Alto, Calif., using a pattern with varying widths of lines on a solid area. Results are shown in Table 2 below. Cyan lines were printed on a yellow background and the bleed rating was determined by the distance the cyan ink traveled from its originally printed boundary into the yellow solid area. The following rating system was used:

| Bleed Rating | Distance Of Ink Travel (mm) |
|---|---|
| 1 | <0.2 |
| 2 | 0.2–0.5 |
| 3 | >0.5 |

Example 2

Control 1 was repeated with the following exceptions: Varying amounts of Cyanamer® N-100, American Cyanamide, Wayne, N.J., shown in Table 1, were added to the yellow and cyan inks prepared as described in Control 1. Inks containing 1% and 3% polymer were prepared. Results are shown in Table 2.

Example 3

Control 1 was repeated with the following exceptions: Varying amounts of Cyanamer® N-10 (American Cyanamide, Wayne, N.J.) having a weight average molecular weight of 1500, shown in Table 1, were added to the yellow and cyan inks prepared as described in Control 1. Inks containing 3% and 5% polymer were prepared. Results are shown in Table 2.

TABLE 2

| | Polyacetylamide Polymer | | | |
|---|---|---|---|---|
| Example # | Commercial Name | % | M.W. | Bleed Rating |
| Control 2 | — | — | — | 3 |
| Example 2 | Cyanamer ® N-100 | 1 | 10,000 | 2 |
| Example 2 | Cyanamer ® N-100 | 3 | 10,000 | 1 |
| Example 3 | Cyanamer ® N-10 | 3 | 1500 | 3 |
| Example 3 | Cyanamer ® N-10 | 5 | 1500 | 2 |

What is claimed is:

1. An ink jet ink comprising:

(a) an aqueous carrier medium;

(b) an aqueous carrier medium insoluble colorant;

(c) a structured polymer dispersant; and (d) a film-forming polyacrylamide polymer having a weight average molecular weight of 500–100,000.

2. The aqueous ink of claim 1 wherein the polyacrylamide polymer has a weight average molecular weight of 1000–50,000.

3. The aqueous ink of claim 1 wherein the structured polymer dispersant is selected from the group consisting of AB, BAB and ABC block copolymers.

4. The ink composition of claim 1 wherein polyacrylamide polymer is present in the amount of 0.1 to 10% by weight, based on the total weight of the ink composition.

5. The ink composition of claim 1 wherein said polymeric dispersant is a block copolymer, and wherein the ink composition comprises 0.1 to 8% pigment, 0.1 to 8% block copolymer, 74 to 99.7% aqueous carrier medium and 0.1 to 10% polyacrylamide polymer, based upon the total weight of the ink composition.

6. The ink composition of claim 1 wherein the polyacrylamide polymer is non-ionic.

7. An ink set for creating a multicolor printed element having reduced color bleed comprising a first ink and a second ink, wherein at least one of said first and second inks comprises an aqueous carrier medium, an aqueous carrier medium insoluble colorant, a structured polymeric dispersant and a film-forming polyacrylamide polymer having a weight average molecular weight of 500–100,000.

8. The ink set of claim 7 wherein the structured polymer dispersant is an AB, BAB or ABC block copolymer.

9. The ink set of claim 7 wherein the aqueous carrier medium soluble, film-forming, polyacrylamide polymer additive is non-ionic.

10. The ink set of claim 7 wherein both the first and second inks comprise an aqueous carrier medium, an aqueous carrier medium insoluble colorant, a structured polymeric dispersant and a film-forming polyacrylamide polymer having a weight average molecular weight of 500–100,000.

* * * * *